(12) United States Patent
Sarkis et al.

(10) Patent No.: US 12,463,697 B2
(45) Date of Patent: Nov. 4, 2025

(54) INTERFERENCE MEASUREMENT FOR SIDELINK

(71) Applicant: QUALCOMM Incorporated, San Diego, CA (US)

(72) Inventors: Gabi Sarkis, San Diego, CA (US); Wanshi Chen, San Diego, CA (US); Alexandros Manolakos, Escondido, CA (US); Sudhir Kumar Baghel, Pleasanton, CA (US)

(73) Assignee: Qualcomm Incorporated, San Diego, CA (US)

( * ) Notice: Subject to any disclaimer, the term of this patent is extended or adjusted under 35 U.S.C. 154(b) by 519 days.

(21) Appl. No.: 17/794,446

(22) PCT Filed: Jan. 27, 2021

(86) PCT No.: PCT/US2021/015330
§ 371 (c)(1),
(2) Date: Jul. 21, 2022

(87) PCT Pub. No.: WO2021/154884
PCT Pub. Date: Aug. 5, 2021

(65) Prior Publication Data
US 2023/0047695 A1 Feb. 16, 2023

(30) Foreign Application Priority Data
Jan. 28, 2020 (GR) .............................. 20200100036

(51) Int. Cl.
H04B 7/06 (2006.01)
H04B 17/336 (2015.01)
H04W 92/18 (2009.01)

(52) U.S. Cl.
CPC .......... *H04B 7/0626* (2013.01); *H04B 7/0632* (2013.01); *H04B 17/336* (2015.01); *H04W 92/18* (2013.01)

(58) Field of Classification Search
CPC ..... H04W 76/14; H04W 92/18; H04W 72/23; H04W 72/02; H04W 72/0446;
(Continued)

(56) References Cited

U.S. PATENT DOCUMENTS

2018/0317112 A1    11/2018  Seo et al.
2019/0173612 A1*   6/2019   Kimura ................. H04L 1/0063
(Continued)

FOREIGN PATENT DOCUMENTS

CN    109644455 A    4/2019
CN    109818727 A    5/2019

OTHER PUBLICATIONS

3GPP TS 38.211 V15.7.0 (Sep. 2019).*
(Continued)

*Primary Examiner* — Pamit Kaur
(74) *Attorney, Agent, or Firm* — Loza & Loza, LLP

(57) ABSTRACT

Aspects relate to mechanisms for measuring the interference on the sidelink for use in calculating the channel quality indicator (CQI) in channel state information (CSI) reporting. Channel state information-interference measurement (CSI-IM) resources on which a sidelink device may measure the interference may be located outside of a bandwidth allocated for the transmission of a physical sidelink shared channel (PSSCH) and/or inside of the allocated bandwidth. The sidelink device may measure respective interference values on one or more CSI-IM resources, identify one or more CQI(s) based on the measured interference value(s) and transmit one or more CSI reports including the one or more CQIs to another sidelink device.

34 Claims, 11 Drawing Sheets

(58) Field of Classification Search
CPC ....... H04W 72/20; H04W 8/005; H04W 4/40; H04W 4/70; H04W 72/04; H04W 72/541; H04W 72/21; H04W 72/542; H04W 24/10; H04W 4/46; H04W 72/56; H04W 88/02; H04W 72/044
See application file for complete search history.

(56) References Cited

U.S. PATENT DOCUMENTS

| | | | |
|---|---|---|---|
| 2020/0022089 A1* | 1/2020 | Guo | H04W 52/26 |
| 2022/0085923 A1* | 3/2022 | Ye | H04W 72/02 |

OTHER PUBLICATIONS

Physical Layer Procedures for NR V2X Sidelink Inter Digital R1-1912742 Nov. 8, 2019.*

Ericsson: "PHY Layer Structure for NR Sidelink", 3GPP TSG RAN WG1 #99, 3GPP Draft; R1-1912597, 3rd Generation Partnership Project (3GPP), Mobile Competence Centre, 650, Route Des Lucioles, F-06921 Sophia-Antipolis Cedex, France, vol. RAN WG1, No. Reno, NV, US, Nov. 18-Nov. 22, 2019, Nov. 8, 2019 (Nov. 8, 2019), 32 Pages, XP051820108, Retrieved from the Internet: URL: https://ftp.3gpp.org/tsg_ran/WG1_RL1/TSGR1_99/Docs/R1-1912597.zip R1-1912597 Ericsson PHY layer structure for NR sidelink.docx [retrieved on Nov. 8, 2019] Section 7, The whole document, Section 3.3 DMRS Design for PSCCH, Section 4 SCI Content, Section 6 PSSCH Design.

Interdigital Inc: "Physical Layer Procedures for NR V2X Sidelink", 3GPP Draft, 3GPP TSG RAN WG1 #99, R1-1912742, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-Nov. 22, 2019, Nov. 8, 2019 (Nov. 8, 2019), XP051820178, 12 Pages, Retrieved from the Internet: URL: https://ftp.3gpp.org/tsg_ran/WG1_RL1/TSGR1_99/Docs/R1-1912742.zip. R1-1912742 Physicals Layer Procedures for NR V2X Sidelink_final.docx [retrieved on Nov. 8, 2019] section 3, pp. 4-5.

International Search Report and Written Opinion—PCT/US2021/015330—ISA/EPO—May 10, 2021.

* cited by examiner

INTERFERENCE MEASUREMENT FOR SIDELINK

CROSS-REFERENCE TO RELATED APPLICATIONS

This application is the U.S. national stage of PCT patent application number PCT/US2021/015330 filed on Jan. 27, 2021. PCT application number PCT/US2021/015330 claims priority to and the benefit of Greece application No. 20200100036 filed Jan. 28, 2020, and assigned to the assignee hereof and hereby expressly incorporated by reference herein as if fully set forth below in its entirety and for all applicable purposes.

TECHNICAL FIELD

The technology discussed below relates generally to sidelink wireless communication networks, and more particularly, to measuring interference on sidelink resources for channel state information (CSI) reporting.

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information-reference signals (CSI-RS), to the UE. After channel estimation, the UE may return a channel state information (CSI) report indicating the quality of the channel to the base station. The CSI may include, for example, a channel quality indicator (CQI) that indicates to the base station an MCS to use for transmissions to the UE.

CSI reporting may also be implemented within a wireless communication system configured for sidelink signaling. With sidelink signaling, a UE (sidelink device) may communicate directly with another sidelink device without transmissions passing through the base station. One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of sidelink wireless communication at a first sidelink device is disclosed. The method includes measuring an interference value on at least a first set of resources outside of an allocated bandwidth of a sidelink carrier. The allocated bandwidth is allocated for a transmission from a second sidelink device to the first sidelink device of a physical sidelink shared channel (PSSCH) including a channel state information-reference signal (CSI-RS). The method further includes identifying a channel quality indicator (CQI) based on the interference value, and transmitting a channel state information (CSI) report including at least the CQI to the second sidelink device.

Another example provides a first sidelink device in a wireless communication network. The first sidelink device includes a wireless transceiver, a memory, and a processor coupled to the wireless transceiver and the memory. The processor and the memory are configured to measure an interference value on at least a first set of resources outside of an allocated bandwidth of a sidelink carrier. The allocated bandwidth is allocated for a transmission from a second sidelink device to the first sidelink device of a physical sidelink shared channel (PSSCH) including a channel state information-reference signal (CSI-RS). The processor and the memory are further configured to identify a channel quality indicator (CQI) based on the interference value, and transmit a channel state information (CSI) report including at least the CQI to the second sidelink device via the wireless transceiver.

Another example provides a first sidelink device in a wireless communication network. The first sidelink device includes means for measuring an interference value on at least a first set of resources outside of an allocated bandwidth of a sidelink carrier. The allocated bandwidth is allocated for a transmission from a second sidelink device to the first sidelink device of a physical sidelink shared channel (PSSCH) including a channel state information-reference signal (CSI-RS). The first sidelink device further includes means for identifying a channel quality indicator (CQI) based on the interference value, and means for transmitting a channel state information (CSI) report including at least the CQI to the second sidelink device.

Another example provides an article of manufacture for use by a first sidelink device in a wireless communication network. The article includes a non-transitory computer-readable medium having stored therein instructions executable by one or more processors of the first sidelink device to measure an interference value on at least a first set of resources outside of an allocated bandwidth of a sidelink carrier. The allocated bandwidth is allocated for a transmission from a second sidelink device to the first sidelink device of a physical sidelink shared channel (PSSCH) including a channel state information-reference signal (CSI-RS). The non-transitory computer-readable medium further includes instructions executable by one or more of the processors to identify a channel quality indicator (CQI) based on the interference value, and transmit a channel state information (CSI) report including at least the CQI to the second sidelink device.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
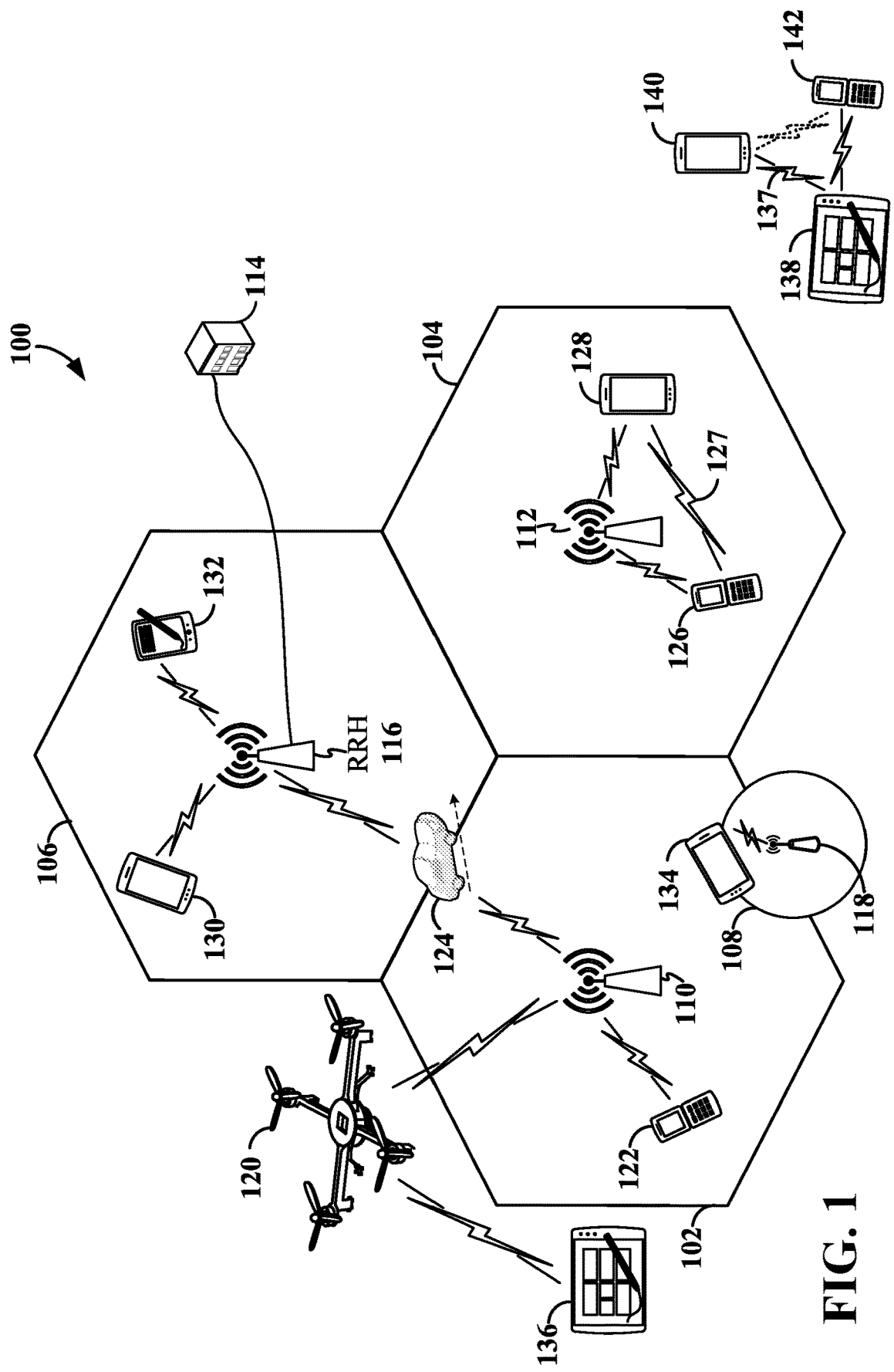
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for measuring the interference on the sidelink for use in calculating the channel quality indicator (CQI) in channel state information (CSI) reporting. Channel state information-interference measurement (CSI-IM) resources on which a sidelink device may measure the interference may be located outside of a bandwidth allocated for the transmission of a physical sidelink shared channel (PSSCH) including a channel state information-reference signal (CSI-RS) to the sidelink device and/or inside of the allocated bandwidth. For example, the CSI-IM resources may be located within a single sub-channel of the allocated bandwidth or across the entire allocated bandwidth. The CSI-IM resources may be configured via radio resource control (RRC) signaling over a proximity services (ProSe) PC5 interface, signaled via sidelink control information (SCI), preconfigured on the sidelink device, or selected by sidelink device within the resources outside of the allocated bandwidth. In some examples, the CSI-IM resources may include two or more symbols (e.g., orthogonal frequency division multiplexing (OFDM) symbols), which may be consecutive or non-consecutive.

The sidelink device may measure respective interference values on one or more CSI-IM resources, identify one or more CQI(s) based on the measured interference value(s) and transmit one or more CSI reports including the one or more CQIs to another sidelink device. In some examples, the CSI-IM resources may include a first set of resources and a second set of resources, where at least one set of resources is located outside the allocated bandwidth. The sidelink device may measure a first interference value on the first set of resources and a second interference value on the second set of resources, and identify first and second CQIs based on the first and second interference values, respectively. The first and second CQIs may then be included within the same or separate CSI reports.

In examples in which the CSI-IM resources include non-consecutive OFDM resources, the sidelink device may measure a respective interference value on each OFDM symbol or each group of consecutive OFDM symbols. In some examples, the sidelink device may further measure a global interference value across all of the OFDM symbols included in the CSI-IM resources. The sidelink device may then identify a single global CQI associated with the global interference value included in the CSI report or respective CQIs associated with each interference value included in the same or separate CSI reports. In some examples, the respective CQIs may be reported differentially with respect to the global CQI.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
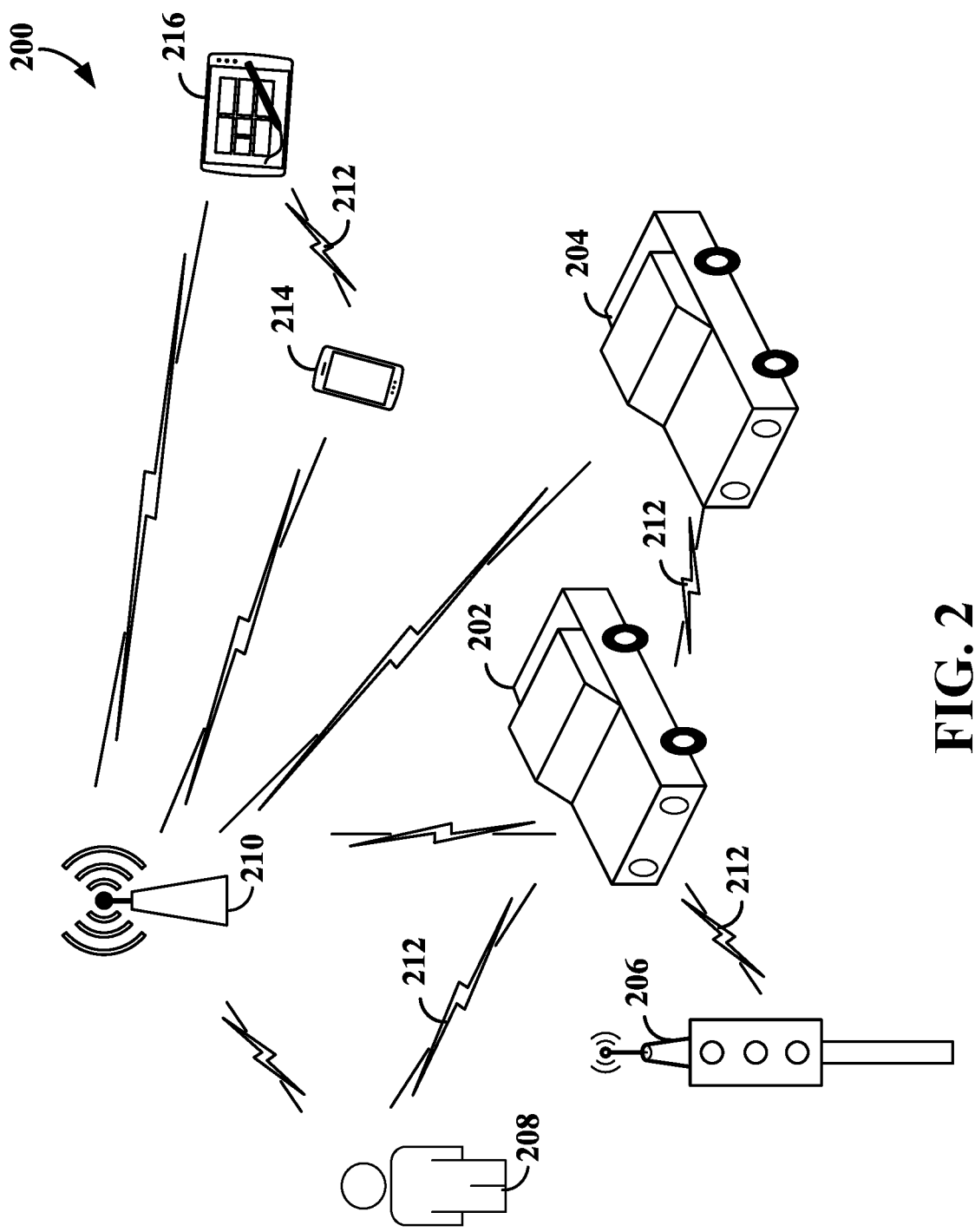
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
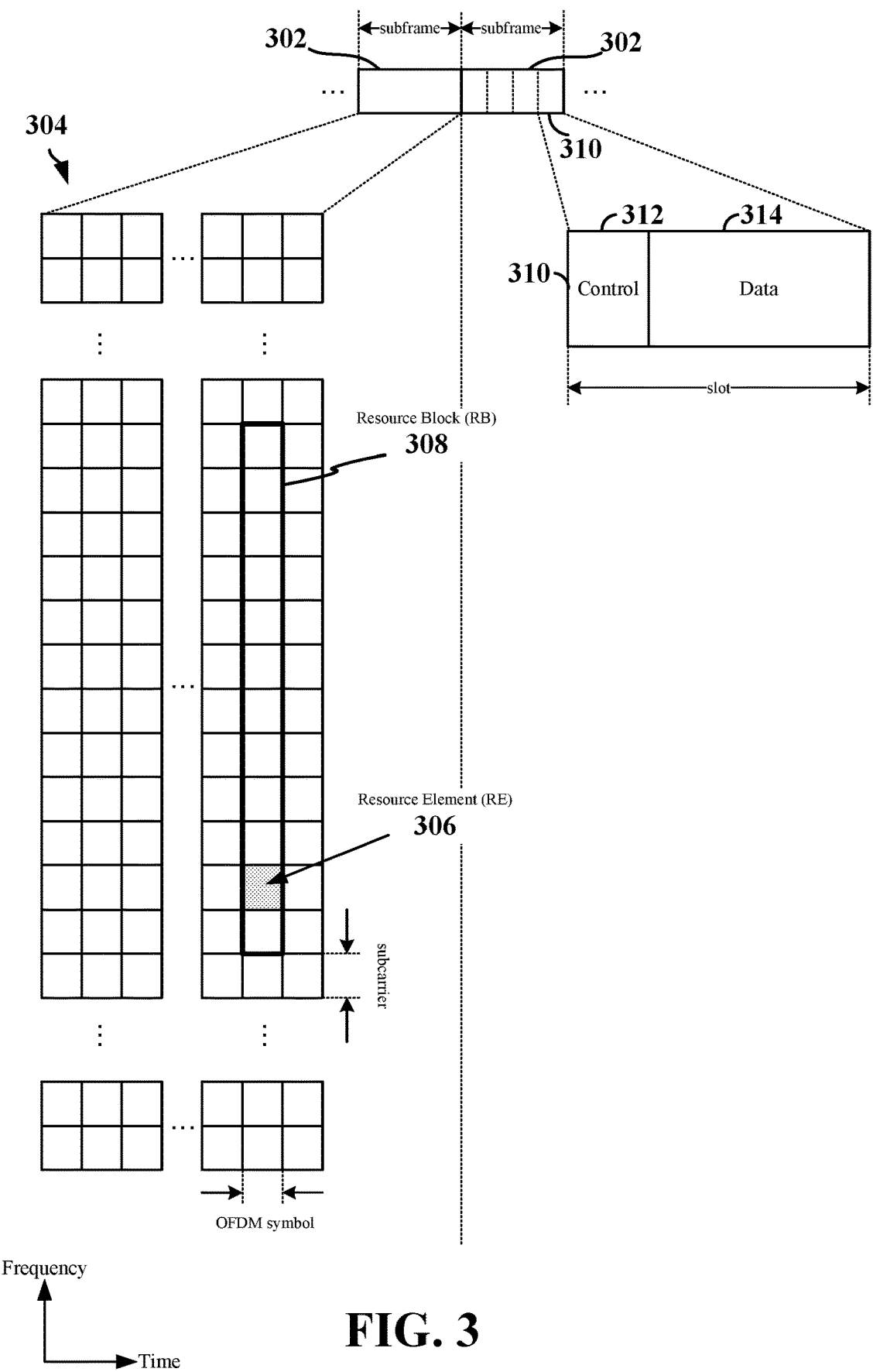
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

For example, for unicast sidelink connections, the PSSCH may include a reference signal, such as a channel state information-reference signal (CSI-RS), for use by a receiving sidelink device in measuring the channel quality (e.g., Signal to Interference Plus Noise Ratio (SINR)). Channel quality measurements (e.g., SINRs) may be used (e.g., in real-time) to aid in providing a channel state information (CSI) report to the transmitting sidelink device for ever-changing channel conditions. For example, channel quality measurements can be used to calculate, determine, produce, or obtain a spectral efficiency (SPEF) of a channel. The SPEF of the measured channel may then be used to identify a channel quality indicator (CQI). For example, the receiving sidelink device may calculate the SPEF and then map the SPEF to a particular CQI.

The receiving sidelink device may then feedback the channel quality (e.g., the CQI) to the transmitting sidelink device within the CSI report. The CSI report may further include a rank indicator (RI), along with a precoding matrix indicator (PMI). The transmitting sidelink device may utilize the CSI report to update the rank associated with the receiving sidelink device and assign resources for future unicast sidelink transmissions to the receiving sidelink device. For example, the CQI indicates to the transmitting sidelink device an MCS to use for the future unicast transmissions to the receiving sidelink device. Although the above description is directed to unicast sidelink transmissions, it should be understood that CSI reporting may also be utilized in groupcast transmissions (e.g., transmissions to a group of sidelink devices).

In some examples, the reference signal (e.g., the CSI-RS) may include a plurality of reference signals. Reference signals may be transmitted via a respective channel measurement resource. Channel measurement resources may include time-frequency resources within which a particular reference signal can be transmitted. For example, channel measurement resources may include non-zero-power (NZP) CSI-RS resources that can be utilized for channel measurement. In addition to channel measurement resources, one or more interference measurement resources can be utilized for interference measurements. Interference measurement resources may include, for example, a zero-power (ZP) CSI-RS resource, hereinafter referred to as a channel state information-interference measurement (CSI-IM) resource. CSI-IM resources are resources on which no power (e.g., no signal) is transmitted by the transmitting sidelink device. As such, the receiving sidelink device is able to measure the interference on the CSI-IM resources. The SPEF value utilized to determine the CQI may be calculated as a function of each of the channel measurement resource and interference measurement resources.

CSI-IM resources are currently defined on the Uu interface to enable UEs to perform interference measurements on the access link (e.g., between a UE and a base station) for CQI calculations. On the access link, each CSI-RS resource for channel measurement is resource-wise associated with a CSI-IM resource by the ordering of the CSI-RS resource and CSI-IM resource in corresponding resource sets. The number of CSI-RS resources for channel measurement is equal to the number of CSI-IM resources. Here, a CSI-IM resource may include two consecutive OFDM symbols in the time domain and two consecutive subcarriers in the frequency domain or one OFDM symbol in the time domain and four consecutive subcarriers in the frequency domain.

However, for sidelink communication, CSI-IM resources have not yet been defined. Therefore, in various aspects, CSI-IM resources may be defined on the sidelink to enable a receiving sidelink device to measure the sidelink interference and identify the CQI in CSI reporting. In some examples, the CSI-IM resources may be located outside of a bandwidth allocated for the transmission of a physical sidelink shared channel (PSSCH) to the sidelink device and/or inside of the allocated bandwidth.

Figure 4:
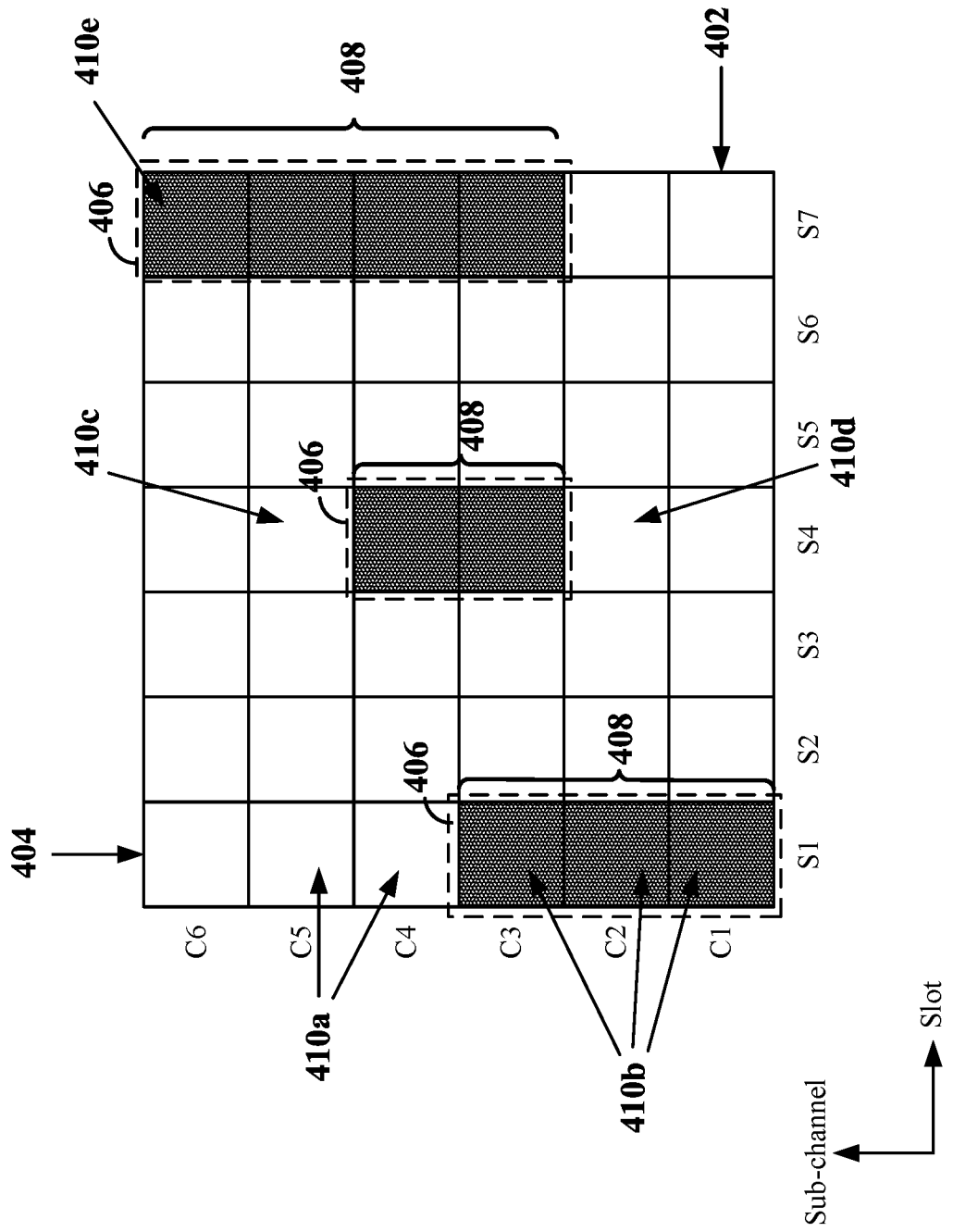
FIG. 4 is a diagram illustrating exemplary sidelink resources that may be utilized to measure the interference on the sidelink according to some aspects.

FIG. 4 is a diagram illustrating exemplary sidelink resources that may be utilized to measure the interference on the sidelink according to some aspects. In the example shown in FIG. 4, sidelink resources on a sidelink carrier are shown time-divided into a plurality of slots 402 (S1, S2, . . . , S7) and frequency-divided into a plurality of sub-channels 404 (C1, C2, . . . , C6). Each sub-channel 404 includes a number of RBs (e.g., ten or more RBs) in the frequency domain. In some examples, for sidelink communication, the smallest unit of resources that can be allocated by a transmitting sidelink device for a transmission to a receiving sidelink device may include one slot in the time domain and one sub-channel in the frequency domain. The number of slots 402 and sub-channels 404 shown in FIG. 4 is merely exemplary, and the present disclosure is not limited to any particular configuration of numbers of slots 402 and sub-channels 404 per subframe/frame or per resource pool.

In the example shown in FIG. 4, the transmitting sidelink device has allocated sub-channels 404 within slots S1, S4, and S7 for transmissions to at least one receiving sidelink device. For example, in slot S1, the transmitting sidelink device has allocated sub-channels C1, C2, and C3, in slot S4, the transmitting sidelink device has allocated sub-channels C3 and C4, and in slot S7, the transmitting sidelink device has allocated sub-channels C3, C4, C5, and C6. Each combination of allocated sub-channel(s) 404 and corresponding slot(s) 402 allocated for a transmission from the transmitting sidelink device to at least one receiving sidelink device forms a respective set of allocated resources 406. In addition, each set of allocated sub-channels 404 forms a respective allocated bandwidth 408 within the corresponding slot 402.

In some examples, one or more sets of allocated resources 406 may be allocated for the transmission of a PSCCH and/or a PSSCH from the transmitting sidelink device to the receiving sidelink device. In some examples, the PSCCH may include sidelink control information (SCI) triggering CSI reporting by the receiving sidelink device(s). In this example, the PSSCH may include at least one CSI-RS for use by the receiving sidelink device(s) in measuring the respective channel quality and generating respective CSI reports.

In addition, CSI-IM resources 410a-410e may further be defined for use by a receiving sidelink device in measuring the interference on the sidelink within the set of allocated resources 406 including at least one CSI-RS within a PSSCH (referred to herein as PSSCH resources 406). In some examples, a CSI-IM resource may be located within the allocated bandwidth 408 of the PSSCH resources 406 (e.g., within one or more sub-channels 404 of one or more slots 402 of the PSSCH resources 406). In some examples, a CSI-IM resource may be located outside of the allocated bandwidth 408 of the PSSCH resources 406. In some examples, CSI-IM resources may be located both inside and outside of the allocated bandwidth 408 of the PSSCH resources 406.

For example, as shown in FIG. 4, in slot S1, CSI-IM resources 410a and 410b are located both inside and outside the allocated bandwidth 408. For example, CSI-IM resource 410a is located outside the allocated bandwidth 408 in slot S1 and includes a bandwidth corresponding to two sub-channels C4 and C5 above the allocated bandwidth 408. In addition, CSI-IM resource 410b is located inside the allocated bandwidth 408 in slot S1 and includes the entire allocated bandwidth 408 of sub-channels C1-C3. In slot S4, CSI-IM resources 410c and 410d are located outside of the allocated bandwidth 408. For example, CSI-IM resource 410c includes a single sub-channel C5 above the allocated bandwidth 408 and CSI-IM resource 410d includes a single sub-channel C1 below the allocated bandwidth 408. In slot S7, CSI-IM resource 410e is located within the allocated bandwidth 408 and includes a single sub-channel C6 of the allocated bandwidth 408.

In examples in which the CSI-IM resources include at least one set of resources outside of the allocated bandwidth 408 of the PSSCH resources 406, the receiving sidelink device may select the CSI-IM resources (e.g., CSI-IM resources 410a) outside of the allocated bandwidth 408 to perform interference measurements. In examples in which the CSI-IM resources include at least one set of resources inside the allocated bandwidth 408 of the PSSCH resources 406, the CSI-IM resources (e.g., CSI-IM resources 410b or 410e) may include a single sub-channel within the allocated bandwidth 408, two or more sub-channels within the allocated bandwidth 408, or the entire allocated bandwidth 408.

In some examples, the CSI-IM resources may include two or more symbols (e.g., orthogonal frequency division multiplexing (OFDM) symbols) of the PSSCH resources 408 within a slot. The symbols may be consecutive or non-consecutive. In some examples, interference measurements may be separately obtained on each of the CSI-IM resources and/or symbols in a slot. For example, a first interference measurement may be obtained on the CSI-IM resources 410c, and a second interference measurement may be obtained on the CSI-IM resources 410d in slot S4. In some examples, a respective CQI may be identified for each interference measurement or a single CQI may be identified based on a combination of the interference measurements.

In some examples, the CSI-IM resources 410a-410e may be preconfigured on the sidelink devices to be inside or outside of the allocated bandwidth 408 of PSSCH resources 406, and may further be preconfigured to include a single sub-channel or multiple sub-channels (e.g., up to the entire allocated bandwidth 408). In addition, the CSI-IM resources may be preconfigured to include one or more symbols within a slot corresponding to the PSSCH resources 406. In this example, the CSI-IM resources 410a-410e may be preconfigured system-wide or per sidelink resource pool. In other examples, the CSI-IM resources 410a-410e may be specified or otherwise configured by the transmitting sidelink device. For example, the transmitting sidelink device may indicate that the CSI-IM resources are inside or outside of the allocated bandwidth 408 of the PSSCH resources 406, and may further indicate the particular sub-channels 404 within the allocated bandwidth 408 of PSSCH resources 406 to be used for interference measurement. In addition, the transmitting sidelink device may indicate the particular symbols within the slot corresponding to the PSSCH resources 406 to be used for interference measurement. In some examples, the transmitting sidelink device may be configured to transmit the indication of the CSI-IM resources within a radio resource control (RRC) message via the PC5 interface to the receiving sidelink device. In other examples, the transmitting sidelink device may be configured to transmit the indication of the CSI-IM resources within SCI via the PSCCH to the receiving sidelink device.

Figure 5:
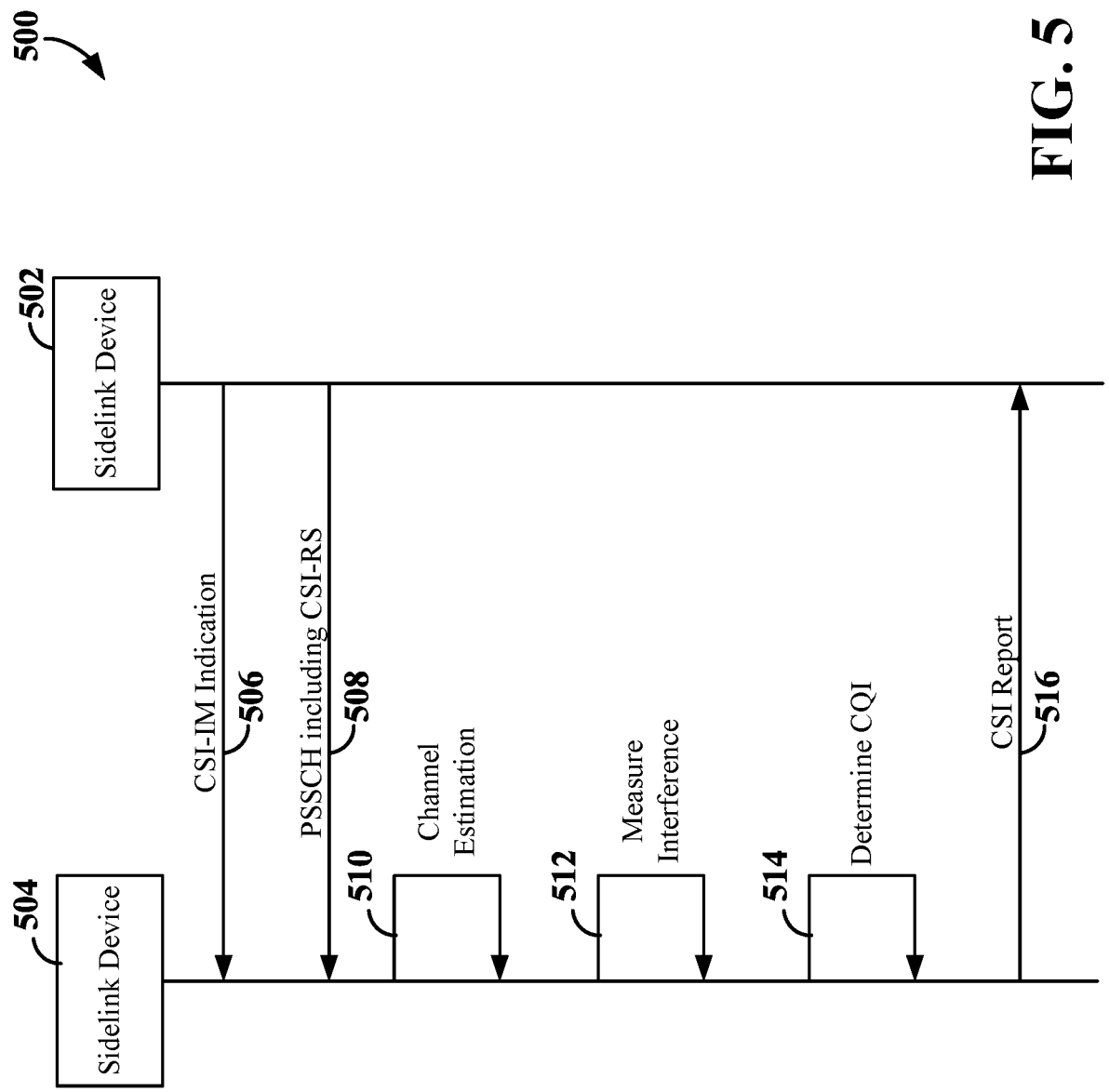
FIG. 5 is a signaling diagram illustrating exemplary signaling between sidelink devices for channel state information (CSI) reporting according to some aspects.

FIG. 5 is a signaling diagram illustrating exemplary signaling between sidelink devices 502 and 504 for channel state information (CSI) reporting within a wireless communication network 500. The wireless communication network 500 may correspond, for example, to the wireless communication network shown in FIG. 2. Each sidelink device 502 and 504 may correspond, for example, to a UE or V2X device as shown in FIGS. 1 and/or 2.

At 506, a first (transmitting) sidelink device 502 may transmit an indication of CSI-IM resources to a second (receiving) sidelink device 504 for the second sidelink device 504 to utilize in performing interference measurements. The CSI-IM resources may include, for example, a zero-power (ZP) CSI-RS resource. In some examples, the indication of CSI-IM resources may be transmitted via a RRC message over the PC5 interface or via SCI within a PSCCH. In some examples, the PSCCH may further trigger CSI reporting by the receiving sidelink device 504.

In some examples, the indication of the CSI-IM resources may indicate that the CSI-IM resources are located inside of the allocated bandwidth of a PSSCH carrying a CSI-RS. For example, the indication of the CSI-IM resources may indicate that the CSI-IM resources are within a single sub-channel of the allocated bandwidth or across the entire allocated bandwidth of the PSSCH. In other examples, the indication of the CSI-IM resources may indicate that the CSI-IM resources are located outside of the allocated bandwidth of the PSSCH carrying the CSI-RS. In this example, the receiving sidelink device may select the CSI-IM resources within an available bandwidth outside of the allocated bandwidth of the PSSCH. For example, the receiving sidelink device may select one or more sub-channels above and/or below the allocated bandwidth within the one or more slots carrying the PSSCH including the CSI-RS.

At 508, the first sidelink device 502 may transmit a PSSCH including a CSI-RS to the second sidelink device 504. In some examples, the CSI-RS may include a plurality of CSI-RSs. Each CSI-RS may be transmitted via a respective channel measurement resource. For example, a channel measurement resource may include non-zero-power (NZP) CSI-RS resource. At 510, the second sidelink device 504 may utilize the NZP CSI-RS resources for channel estimation. For example, the channel estimate may include a vector $\{h_k\}_{k=1}^{K}$, where K is the number of allocated pilots in the channel measurement resource, k is the index of the pilot, and $h_k$ is the channel response coefficient at pilot k. In some examples, the channel response coefficients may be selected from preconfigured values based on one or more estimated parameters, such as the signal-to-noise ratio (SNR), Doppler, delay spread, and/or other suitable parameters, which may be estimated using a tracking reference signal (TRS) or PSSCH.

At 512, the second sidelink device 504 may utilize the CSI-IM resource(s) to measure the interference on the channel. For example, the second sidelink device 504 may measure the interference power level on the CSI-IM resources of the sidelink channel (e.g., the total interference power level collectively produced by interfering sidelink devices communicating on the sidelink carrier).

At 514, the second sidelink device 504 may determine the CQI from the measured interference and channel estimation. For example, the second sidelink device 504 may calculate the SPEF of the channel based on the channel estimate and the interference measurement. The second sidelink device 504 may then determine the CQI from the SPEF. In some examples, the CQI may include an index (e.g., a CQI index) ranging from 0 to 15. The CQI index may indicate, for example, the highest MCS at which the Block Error Rate (BLER) of the channel does not exceed 10%. For example, the second sidelink device 504 may access a predefined mapping between SPEF threshold values and CQI indexes to identify the CQI index as a function of the calculated SPEF. In this example, a CQI index may be chosen based on a maximum SPEF threshold value that is less than or equal to the calculated SPEF of the channel. At 516, the second sidelink device 504 may generate and transmit a CSI report, including the identified CQI, along with a RI and PMI, to the first sidelink device 502.

Figure 6:
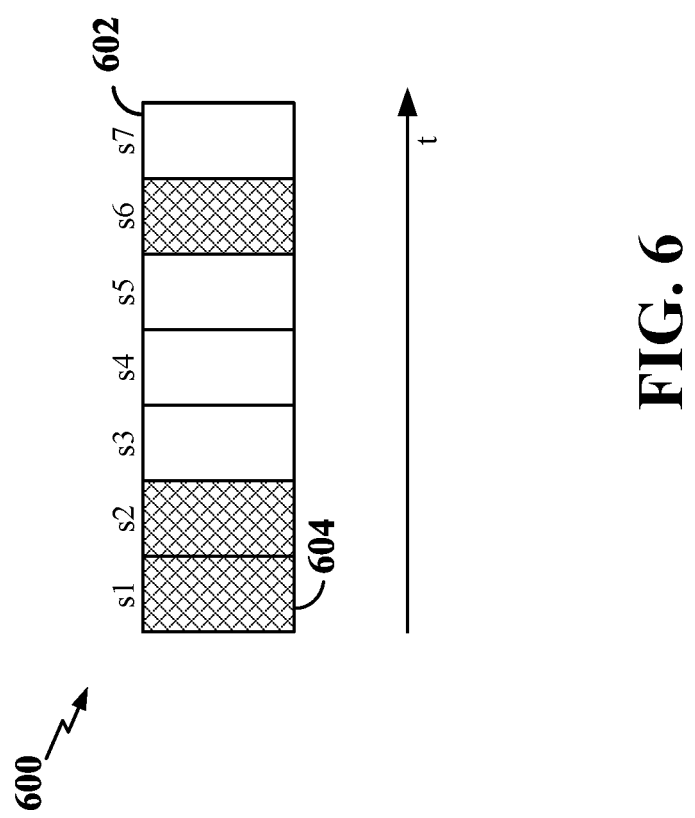
FIG. 6 is a diagram illustrating exemplary symbols within a slot that may be utilized to measure the interference on the sidelink according to some aspects.

FIG. 6 is a diagram illustrating exemplary symbols 602 within a slot 600 that may be utilized to measure the interference on the sidelink according to some aspects. In the example shown in FIG. 6, the slot 600 includes seven OFDM symbols 602 (s1, s2, ..., s7). However, it should be understood that the slot 600 may include any suitable number of OFDM (or SC-FDMA) symbols 602. One or more of the symbols 602 in the slot may be associated with CSI-IM resources 604. For example, one or more symbols 602 may include one or more sub-channels allocated or selected for the measurement of interference on the sidelink channel. In the example shown in FIG. 6, CSI-IM resources 604 are located on symbols s1, s2, and s6 of the slot 600. Thus, the CSI-IM resources 604 allocated or selected on the sidelink may include more than two OFDM symbols and may further include consecutive and/or non-consecutive OFDM symbols.

In some examples, interference measurements may be separately obtained on each of the CSI-IM symbols. For example, a first interference measurement may be obtained on the CSI-IM resources in symbol s1, a second interference measurement may be obtained on the CSI-IM resources in symbol s2, and a third interference measurement may be obtained on the CSI-IM resources in symbol s3. In other examples, interference measurements may be separately obtained for non-consecutive symbols and for groups of consecutive symbols. For example, a first interference measurement may be obtained on the CSI-IM resources in consecutive symbols s1 and s2, and a second interference measurement may be obtained on the CSI-IM resources in symbol s6. In other examples, a global interference measurement may be obtained across the set of non-consecutive symbols s1, s2, and s6. In some examples, a respective CQI may be identified for each interference measurement. In other examples, a global CQI may be identified based on the global interference measurement. In still other examples, the CQI may be identified based on a combination of the separately obtained interference measurements.

Figure 7:
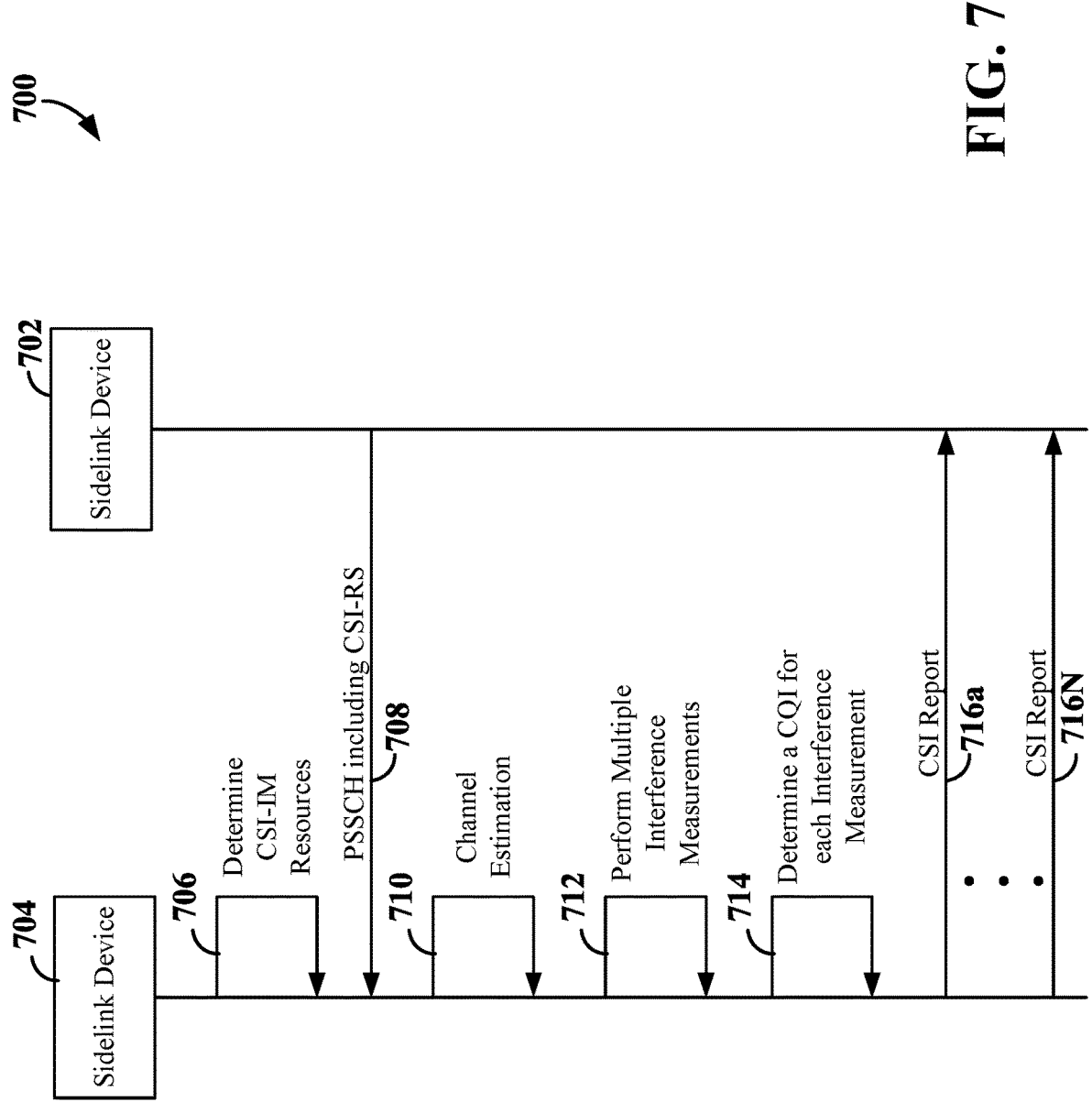
FIG. 7 is a signaling diagram illustrating other exemplary signaling between sidelink devices for CSI reporting according to some aspects.

FIG. 7 is a signaling diagram illustrating other exemplary signaling between sidelink devices 702 and 704 for CSI reporting within a wireless communication network 700. The wireless communication network 700 may correspond, for example, to the wireless communication network shown in FIG. 2. Each sidelink device 702 and 704 may correspond, for example, to a UE or V2X device as shown in FIGS. 1 and/or 2.

At 706, a second (receiving) sidelink device 704 may determine CSI-IM resources to be utilized in measuring interference on the sidelink channel between the second sidelink device and a first (transmitting) sidelink device 702. In some examples, the CSI-IM resources may be preconfigured on the second sidelink device. In other examples, an indication of the CSI-IM resources may be transmitted from the first sidelink device 702 to the second sidelink device 704 via RRC signaling or within SCI of a PSCCH. The CSI-IM resources may include two or more sub-channels and/or two or more symbols within a slot. In some examples, the sub-channels may include one or more sub-channels inside the allocated bandwidth of a PSSCH including a CSI-RS and one or more sub-channels outside the allocated PSSCH bandwidth. In some examples, the sub-channels and/or symbols may include at least one or more non-consecutive sub-channels and/or symbols.

At 708, the first sidelink device 702 may transmit a PSSCH including a CSI-RS to the second sidelink device 704. In some examples, the CSI-RS may include a plurality of CSI-RSs. Each CSI-RS may be transmitted via a respective channel measurement resource. For example, a channel measurement resource may include non-zero-power (NZP) CSI-RS resource.

At 710, the second sidelink device 704 may utilize the NZP CSI-RS resources for channel estimation. For example, the channel estimate may include a vector $\{h\_k\}_{(k=1)}^{K}$, where K is the number of allocated pilots in the channel measurement resource, k is the index of the pilot, and h_k is the channel response coefficient at pilot k. In some examples, the channel response coefficients may be selected from preconfigured values based on one or more estimated parameters, such as the signal-to-noise ratio (SNR), Doppler, delay spread, and/or other suitable parameters, which may be estimated using a tracking reference signal (TRS) or PSSCH.

At 712, the second sidelink device 704 may perform multiple (e.g., two or more) interference measurements on the CSI-IM resources. For example, a respective interference measurement may be obtained on the CSI-IM resources inside the allocated bandwidth and the CSI-IM resources outside the allocated bandwidth. Using the example of CSI-IM resources inside and outside of PSSCH resources in slot S1 of FIG. 4, a first interference measurement may be obtained on the CSI-IM resources in sub-channel C3 and a second interference measurement may be obtained on the CSI-IM resources in sub-channels C1 and C2. As another example, a respective interference measurement may be obtained for each non-consecutive sub-channel and/or each non-consecutive symbol of the CSI-IM resources. Using the example of CSI-IM resources in non-consecutive sub-channels in slot S4 of FIG. 4 a first interference measurement may be obtained on the CSI-IM resources in sub-channel C5 and a second interference measurement may be obtained on the CSI-IM resources in sub-channel C2. Using the example of non-consecutive symbols shown in FIG. 6, a first interference measurement may be obtained on symbols s1 and s2 and a second interference measurement may be obtained on symbol s6. In some examples, the second sidelink device 704 may further obtain a global interference measurement across the CSI-IM resources.

At 714, the second sidelink device 704 may determine a respective CQI for each interference measurement. For example, the second sidelink device may determine the respective CQI based on the combination of the channel estimate and the respective interference measurement. In some examples, the second sidelink device 704 may further determine a global CQI based on the global interference measurement.

At 716a . . . 716N, the second sidelink device 704 may generate and transmit a respective CSI report for each identified CQI to the first sidelink device 702. Each CSI report may include one of the CQI values associated with one of the interference measurements (e.g., one of the CSI-IM resources). In some examples, each CSI report may further indicate the respective CSI-IM resource associated with the CQI. In some examples, a single CSI report may be generated including respective entries for each of the CQI values associated with each of the CSI-IM resources. In some examples, the CSI report may include respective differential CQI values associated with the respective CQI values. Each differential CQI value may be based on a difference between the respective CQI value and the global CQI value.

Figure 8:
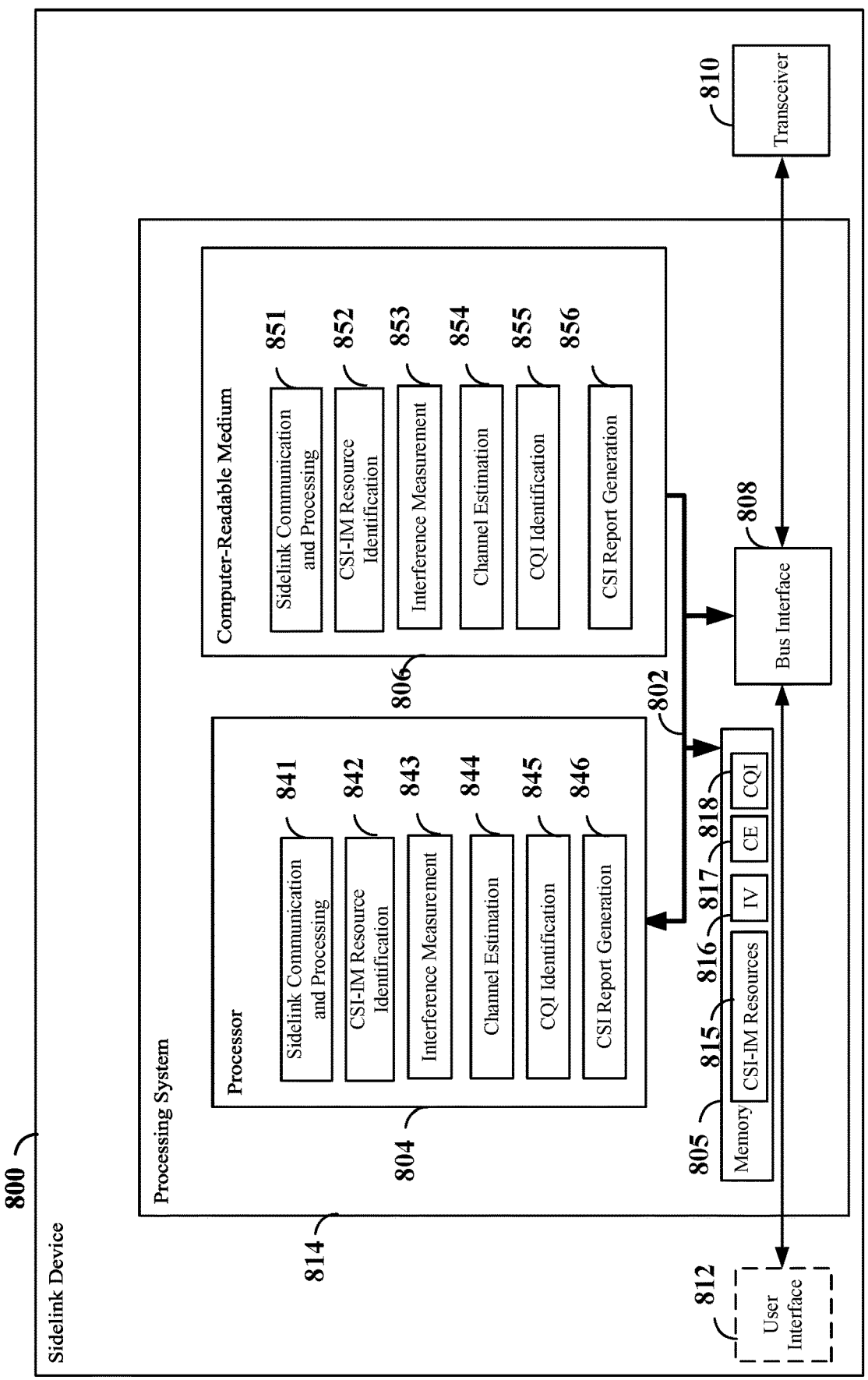
FIG. 8 is a block diagram illustrating an example of a hardware implementation for a sidelink device employing a processing system according to some aspects.

FIG. 8 is a conceptual diagram illustrating an example of a hardware implementation for an exemplary sidelink device 800 employing a processing system 814. For example, the sidelink device 800 may be a UE or V2X device as illustrated in any one or more of FIGS. 1, 2, 5 and/or 7.

The sidelink device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the sidelink device 800 may be configured to perform any one or more of the functions described herein. That is, the processor 804, as utilized in a sidelink device 800, may be used to implement any one or more of the processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., air interface). A user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include sidelink communication and processing circuitry 841, configured to communicate with another sidelink device over a sidelink carrier. In some examples, the communication and processing circuitry 841 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 841 may be configured to receive a sidelink signal over the sidelink carrier from a transmitting sidelink device at a mmWave frequency or a sub-6 GHz frequency via the transceiver 810. The communication and processing circuitry 841 may further be configured to process the sidelink signal. In some examples, the sidelink signal may utilize a particular MCS, rank, and PMI selected by the transmitting sidelink device based on a CSI report provided by the sidelink device 800. For example, the communication and processing circuitry 841 may further be configured to receive one or more reference signals (e.g., CSI-RS) within one or more resources (e.g., a channel measurement resources) from the transmitting sidelink device and to transmit the CSI report to the transmitting sidelink device in response to the received reference signal(s). The CSI report may include, for example, the CQI, PMI, and RI.

In some examples, the communication and processing circuitry 841 may further be configured to receive an indication of CSI-IM resources (e.g., location of the CSI-IM resources) from the transmitting sidelink device. For example, the communication and processing circuitry 841 may be configured to receive an RRC message or SCI including the indication of the CSI-IM resources. The communication and processing circuitry 841 may further be configured to execute communication and processing software 851 stored in the computer-readable medium 806 to implement one or more of the functions described herein.

The processor 804 may further include CSI-IM resource identification circuitry 842, configured to identify one or more CSI-IM resources 815 within one or more slots including an allocated bandwidth of a PSSCH including a CSI-RS. In some examples, the CSI-IM resources 815 may be preconfigured on the sidelink device 800 and stored within, for example, the memory 805. In this example, the CSI-IM resource identification circuitry 842 may be configured to access the memory 805 to retrieve an indication of the preconfigured CSI-IM resources 815. The indication of the preconfigured CSI-IM resources 815 may include, for example, a number of sub-channels inside and/or outside the allocated PSSCH bandwidth. The indication of the preconfigured CSI-IM resources 815 may further include a number of consecutive and/or non-consecutive symbols or an indication of particular symbols within the slot containing the CSI-RS. The CSI-IM resource identification circuitry 842 may be configured to select one or more sub-channels inside and/or outside the allocated PSSCH bandwidth based on the preconfigured number of sub-channels to be utilized for interference measurements inside and/or outside the allocated PSSCH bandwidth. The preconfigured CSI-IM resources 815 may further be configured to utilize the particular indicated symbols or to select one or more consecutive and/or non-consecutive symbols based on the indication of the preconfigured CSI-IM resources. In some examples, the CSI-IM resources 815 may be preconfigured on the sidelink device 800 system-wide or per sidelink resource pool.

In other examples, the CSI-IM resource identification circuitry 842 may be configured to receive the indication of the CSI-IM resources 815 from the transmitting sidelink device in the RRC message or SCI and to store the indication of the CSI-IM resources 815 within, for example, the memory 805. In some examples, the received indication of the CSI-IM resources 815 may identify one or more sub-channels inside and/or outside the allocated PSSCH bandwidth, and may further identify one or more consecutive or non-consecutive symbols within which to perform interference measurements. In examples in which the received indication of the CSI-IM resources includes an indication to utilize sub-channels outside of the allocated PSSCH bandwidth without identifying the specific sub-channels, the CSI-IM resource identification circuitry 842 may further be configured to select one or more sub-channels outside of the PSSCH bandwidth as the CSI-IM resources 815. The CSI-IM resource identification circuitry 842 may further be configured to execute CSI-IM resource identification software 852 stored in the computer-readable medium 806 to implement one or more of the functions described herein.

The processor 804 may further include interference measurement circuitry 843, configured to measure at least one interference value (IV) 816 on the CSI-IM resources 815. For example, the interference measurement circuitry 843 may operate together with the communication and processing circuitry 841 and transceiver 810 to measure the interference value(s) 816. In some examples, the interference measurement circuitry 843 may be configured to measure a single interference value 816 on the CSI-IM resources. For example, the single interference value 816 may include a global interference value measured across all of the consecutive and/or non-consecutive CSI-IM resources. In other examples, the interference measurement circuitry 843 may be configured to measure a respective interference value 816 on the CSI-IM resources inside the allocated PSSCH bandwidth and the CSI-IM resources outside the allocated PSSCH bandwidth. In other examples, the interference measurement circuitry 843 may be configured to measure a respective interference value 816 on each non-consecutive sub-channel and/or each non-consecutive symbol (or group of symbols) of the CSI-IM resources. The interference measurement value(s) 816 may be stored, for example, within memory 805 for further processing. The interference measurement circuitry 843 may further be configured to execute interference measurement software 853 stored in the computer-readable medium 806 to implement one or more of the functions described herein.

The processor may further include channel estimation circuitry 844, configured to estimate a channel between the sidelink device 800 and the transmitting sidelink device to produce a channel estimate (CE) 817. In some examples, the channel estimation circuitry 844 may be configured to estimate the channel as a vector of channel response coefficients, each corresponding to a pilot within a CSI-RS channel measurement resource received via the communication and processing circuitry 841 and the transceiver 810. The channel estimation circuitry 844 may further be configured to execute channel measurement software 854 stored in the computer-readable medium 806 to implement one or more of the functions described herein.

The processor 804 may further include CQI identification circuitry 845, configured to identify a CQI 818 based on the interference value(s) 816 and the channel estimate 817. For example, the CQI identification circuitry 845 may be configured to calculate a SPEF value for the channel between the sidelink device 800 and the transmitting sidelink device as a function of the interference value(s) 816 and the channel estimate 817. The CQI identification circuitry 845 may further be configured to utilize the SPEF value determine the CQI index.

In some examples, the CQI identification circuitry 845 may be configured to identify a single CQI 818 based on the interference value(s) 816. For example, the single CQI 818 may correspond, for example, to a global CQI based on a global interference value 816 measured across all of the CSI-IM resources. As another example, the single CQI 818 may be identified based on a combination of respective interference value(s) 816 measured inside and outside the allocated PSSCH bandwidth and/or measured on non-consecutive sub-channels and/or symbols (or groups of symbols).

In some examples, the CQI identification circuitry 845 may be configured to identify a respective CQI 818 for each interference value 816. For example, the CQI identification circuitry 845 may be configured to identify a respective CQI for CSI-IM resources 815 located inside and outside the PSSCH bandwidth and/or non-consecutive sub-channels and/or symbols (or groups of symbols) of the CSI-IM resources. The CQI identification circuitry 845 may further be configured to execute CQI identification software 855 stored in the computer-readable medium 806 to implement one or more of the functions described herein.

The processor 804 may further include CSI report generation circuitry 846, configured to generate one or more CSI reports including the CQI value(s) (e.g., CQI index(es)), along with the corresponding RI and PMI, for transmission to the transmitting sidelink device via the communication and processing circuitry 841 and transceiver 810. In some examples, the CSI report generation circuitry 846 may generate a single CSI report that includes one or more CQIs. For example, the single CSI report may include multiple CQI entries, each for including a respective CQI for each of the measured interference value(s) 816. In some examples, each CQI entry may include a respective differential CQI value indicating a difference between the respective CQI value and the global CQI value. In some examples, the CSI report generation circuitry 846 may be configured to generate a respective CSI report for each of the interference value(s) 816. In this example, the CSI report generation circuitry 846 may be configured to include the respective CQI 818 corresponding to the associated interference value 816 in the respective CSI report. The CSI report generation circuitry 846 may further be configured to execute CSI report generation software 856 stored in the computer-readable medium 806 to implement one or more of the functions described herein.

Figure 9:
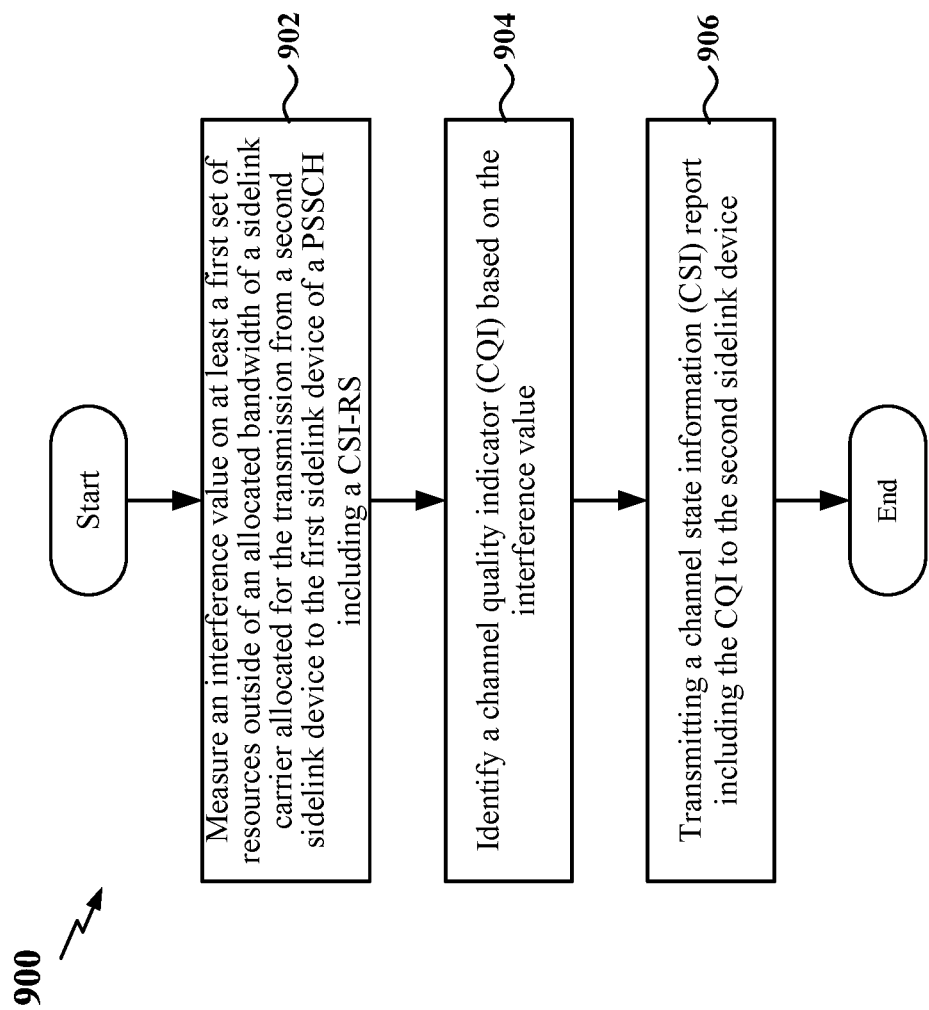
FIG. 9 is a flow chart of an exemplary method for a sidelink device to measure interference on the sidelink for CSI reporting according to some aspects.

FIG. 9 is a flow chart 900 of a method for a sidelink device to measure interference on the sidelink for CSI reporting according to some aspects. As described below, some or all illustrated features may be omitted in a particular implementation within the scope of the present disclosure, and some illustrated features may not be required for implementation of all embodiments. In some examples, the method may be performed by the sidelink device 800, as described above and illustrated in FIG. 8, by a processor or processing system, or by any suitable means for carrying out the described functions.

At block 902, the sidelink device (e.g., a first sidelink device) may measure an interference value on at least a first set of resources outside of an allocated bandwidth of a sidelink carrier allocated for the transmission from a second sidelink device to the first sidelink device of a PSSCH including a CSI-RS. In some examples, the first set of resources may include one or more sub-channels (e.g., which may be above and/or below the allocated PSSCH bandwidth), and may further include one or more consecutive or non-consecutive symbols. In some examples, the first set of resources may include more than two symbols.

In some examples, the first sidelink device may further be configured to measure the interference value (or a separate interference value) on a second set of resources within the allocated PSSCH bandwidth. In some examples, the interference value may include two or more interference values, each associated with the first set of resources or the second set or resources and/or non-consecutive sub-channels and/or symbols (or groups of symbols) within the first set of resources and/or the second set of resources. In some examples, the interference value may include a global interference value measured across non-consecutive sub-channels and/or symbols. In some examples, the first sidelink device may select the first set of resources based on the allocated bandwidth. For example, the interference measurement circuitry 843, together with the CSI-IM resource identification circuitry 842, communication and processing circuitry 841 and transceiver 810, shown and described above in connection with FIG. 8 may measure the interference value.

At block 904, the first sidelink device may identify a channel quality indicator (CQI) based on the interference value. The CQI may further be identified based on a channel estimate obtained from the CSI-RS. In some examples, the first sidelink device may identify a single CQI based on one or more interference value(s). For example, the single CQI may correspond, for example, to a global CQI based on the global interference value or to a CQI identified based on a combination of respective interference value(s) measured inside and outside the allocated PSSCH bandwidth and/or measured on non-consecutive sub-channels and/or symbols (or groups of symbols). In some examples, first sidelink device may identify a respective CQI for each measured interference value. For example, the CQI identification circuitry 845 shown and described above in connection with FIG. 8 may identify the CQI.

At block 906, the first sidelink device may generate and transmit a CSI report including the CQI to the second sidelink device. In some examples, the first sidelink device may generate a single CSI report that includes one or more CQIs. For example, the single CSI report may include multiple CQI entries, each for including a respective CQI for each of the measured interference value(s). In some examples, each CQI entry may include a respective differential CQI value indicating a difference between the respective CQI value and the global CQI value. In some examples, the first sidelink device may generate a respective CSI report for each of the interference value(s). In this example, the first sidelink device may include the respective CQI corresponding to the associated interference value in the respective CSI report. For example, the CSI report generation circuitry 846, together with the communication and processing circuitry 841 and the transceiver 810, shown and described above in connection with FIG. 8 may transmit the CSI report to the second sidelink device.

Figure 10:
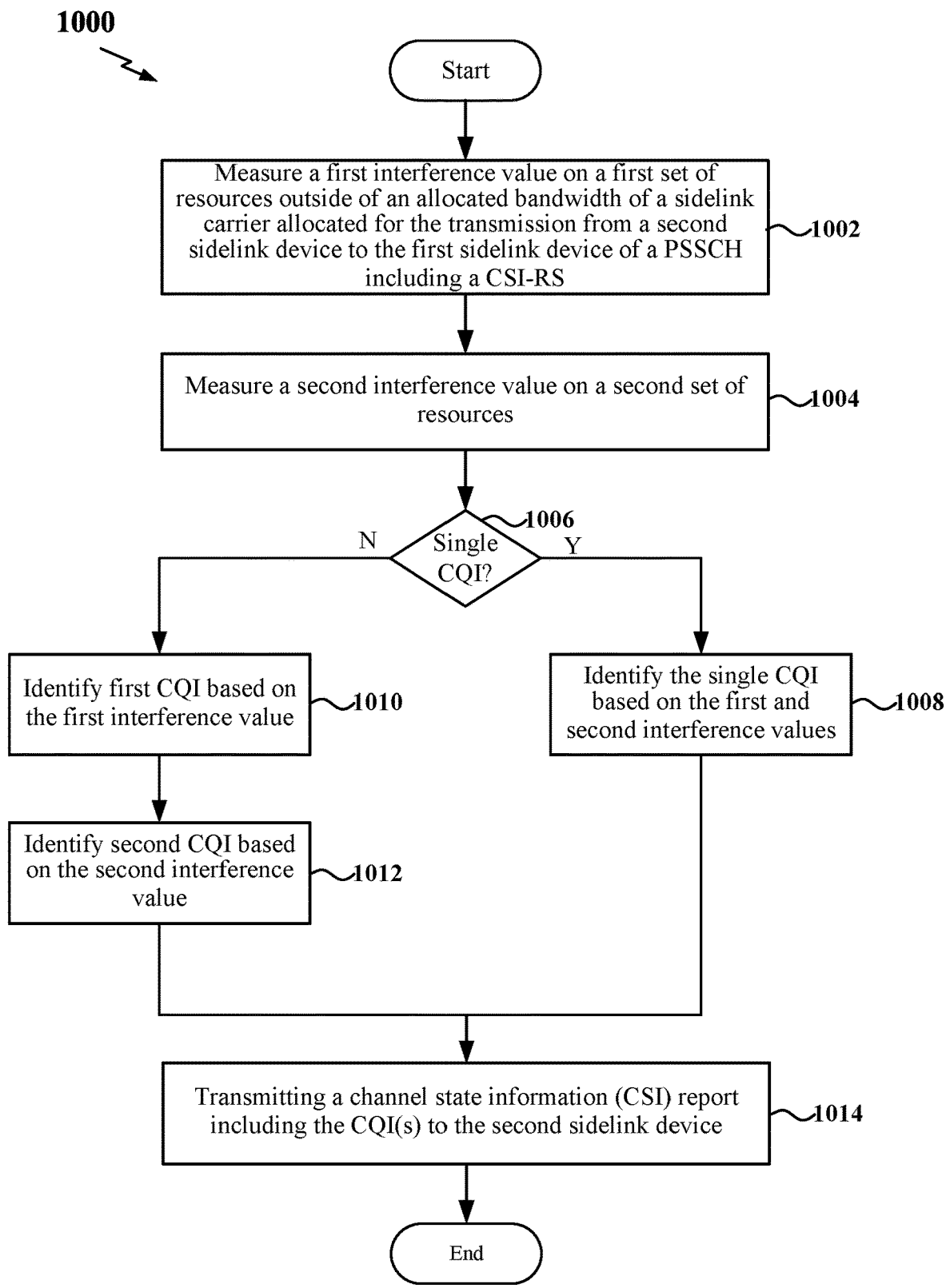
FIG. 10 is a flow chart of another exemplary method for a sidelink device to measure interference on the sidelink for CSI reporting according to some aspects.

FIG. 10 is a flow chart 1000 of another method for a sidelink device to measure interference on the sidelink for CSI reporting according to some aspects. As described below, some or all illustrated features may be omitted in a particular implementation within the scope of the present disclosure, and some illustrated features may not be required for implementation of all embodiments. In some examples, the method may be performed by the sidelink device 800, as described above and illustrated in FIG. 8, by a processor or processing system, or by any suitable means for carrying out the described functions.

At block 1002, the sidelink device (e.g., a first sidelink device) may measure a first interference value on a first set of resources outside of an allocated bandwidth of a sidelink carrier allocated for the transmission from a second sidelink device to the first sidelink device of a PSSCH including a CSI-RS. In some examples, the first set of resources may include one or more sub-channels (e.g., which may be above and/or below the allocated PSSCH bandwidth), and may further include one or more consecutive or non-consecutive symbols. In some examples, the first sidelink device may select the first set of resources based on the allocated bandwidth. For example, the interference measurement circuitry 843, together with the CSI-IM resource identification circuitry 842, communication and processing circuitry 841 and transceiver 810, shown and described above in connection with FIG. 8 may measure the first interference value.

At block 1004, the first sidelink device may measure a second interference value on a second set of resources. In some examples, the first set of resources includes a first bandwidth above the allocated bandwidth and the second set of resources includes a second bandwidth below the allocated bandwidth. In some examples, the second set of resources are within the allocated bandwidth. For example, the second set of resources may be within a single sub-channel within the allocated bandwidth. As another example, the second set of resources may include the allocated bandwidth.

In some examples, the first set of resources and the second set of resources comprise channel state information-interference measurement (CSI-IM) resources defined for the first sidelink device. In some examples, the first sidelink device may further receive an indication of the CSI-IM resources from the second sidelink device via a radio resource control message or sidelink control information. In some examples, the indication of the CSI-IM resources is preconfigured on the first sidelink device. For example, the interference measurement circuitry 843, together with the CSI-IM resource identification circuitry 842, communication and processing circuitry 841 and transceiver 810, shown and described above in connection with FIG. 8 may measure the second interference value.

At block 1006, the first sidelink device may determine whether a single channel quality indicator (CQI) value is to be identified. In examples in which a single CQI value is to be identified (Y branch of block 1006), at block 1008, the first sidelink device may identify a single CQI based on the first and second interference value. For example, the single CQI may correspond to a global CQI based on a combination of the first and second interference values. The single CQI may further be identified based on a channel estimate obtained from the CSI-RS. For example, the CQI identification circuitry 845 shown and described above in connection with FIG. 8 may identify the single CQI.

In examples in which more than one CQI is to be identified (N branch of block 1006), at block 1010, the first sidelink device may identify a first CQI based on the first interference value. In addition, at block 1012, the first sidelink device may further identify a second CQI based on the second interference value. Each of the first and second CQIs may further be identified based on a channel estimate obtained from the CSI-RS. For example, the CQI identification circuitry 845 shown and described above in connection with FIG. 8 may identify the first and second CQI.

At block 1014, the first sidelink device may generate and transmit a CSI report including the CQI(s) to the second sidelink device. In some examples, the first sidelink device may generate and transmit a single CSI report that includes the single CQI. In some examples, the first sidelink device may generate and transmit a single CSI report that includes both the first CQI and the second CQI. For example, the single CSI report may include multiple CQI entries, each including one of the first CQI or the second CQI. In some examples, the first sidelink device may generate and transmit a respective CSI report for each of the first CQI and the second CQI. In this example, the first sidelink device may transmit a first CSI report including the first CQI and a second CSI report including the second CQI. For example, the CSI report generation circuitry 846, together with the communication and processing circuitry 841 and the transceiver 810, shown and described above in connection with FIG. 8 may transmit the CSI report to the second sidelink device.

Figure 11:
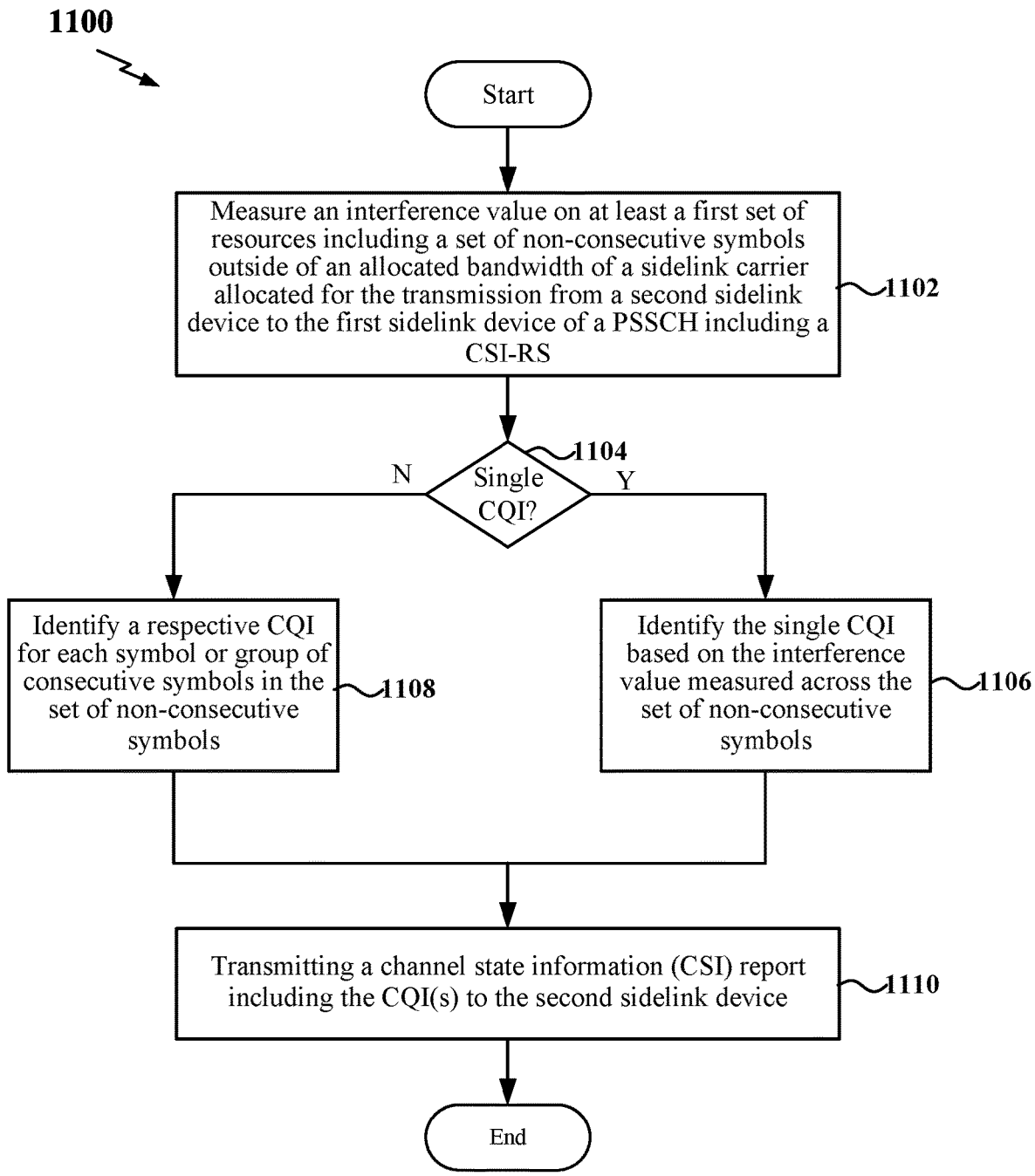
FIG. 11 is a flow chart of another exemplary method for a sidelink device to measure interference on the sidelink for CSI reporting according to some aspects.

FIG. 11 is a flow chart 1100 of another method for a sidelink device to measure interference on the sidelink for CSI reporting according to some aspects. As described below, some or all illustrated features may be omitted in a particular implementation within the scope of the present disclosure, and some illustrated features may not be required for implementation of all embodiments. In some examples, the method may be performed by the sidelink device 800, as described above and illustrated in FIG. 8, by a processor or processing system, or by any suitable means for carrying out the described functions.

At block 1102, the sidelink device (e.g., a first sidelink device) may measure an interference value on at least a first set of resources including a set of non-consecutive symbols. The first set of resources is outside of an allocated bandwidth of a sidelink carrier allocated for the transmission from a second sidelink device to the first sidelink device of a PSSCH including a CSI-RS. In some examples, the first set of resources may include one or more sub-channels (e.g., which may be above and/or below the allocated PSSCH bandwidth). In some examples, the first sidelink device may select the first set of resources based on the allocated bandwidth. For example, the interference measurement circuitry 843, together with the CSI-IM resource identification circuitry 842, communication and processing circuitry 841 and transceiver 810, shown and described above in connection with FIG. 8 may measure the first interference value.

At block 1104, the first sidelink device may determine whether a single channel quality indicator (CQI) value is to be identified. In examples in which a single CQI value is to be identified (Y branch of block 1104), at block 1106, the first sidelink device may identify the single CQI based on the interference value measured across the set of non-consecutive symbols. The single CQI may further be identified based on a channel estimate obtained from the CSI-RS. For example, the CQI identification circuitry 845 shown and described above in connection with FIG. 8 may identify the single CQI.

In examples in which more than one CQI is to be identified (N branch of block 1104), at block 1108, the first sidelink device may identify a respective CQI for each symbol of the set of non-consecutive symbols or for each group of consecutive symbols within the set of non-consecutive symbols. Each of the CQIs may further be identified based on a channel estimate obtained from the CSI-RS. For example, the CQI identification circuitry 845 shown and described above in connection with FIG. 8 may identify the first and second CQI.

At block 1110, the first sidelink device may generate and transmit a CSI report including the CQI(s) to the second sidelink device. In some examples, the first sidelink device may generate and transmit a single CSI report that includes the single CQI. In some examples, the first sidelink device may generate and transmit a single CSI report that includes the respective CQIs for each symbol or group of consecutive symbols within the set of non-consecutive symbols. For example, the single CSI report may include multiple CQI entries, each including one of the respective CQIs. In some examples, the first sidelink device may generate and transmit a CSI report that includes respective differential CQI values associated with the respective CQIs. The respective differential CQI values may each include respective differences between the respective CQIs and a global CQI based on a global interference measurement across the set of non-consecutive symbols. For example, the CSI report generation circuitry 846, together with the communication and processing circuitry 841 and the transceiver 810, shown and described above in connection with FIG. 8 may transmit the CSI report to the second sidelink device.

In one configuration, the first sidelink device 800 in a wireless communication network includes means for performing the processes, procedures, and methods described in relation to FIGS. 9-11. For example, the first sidelink device may include means for measuring an interference value on at least a first set of resources outside of an allocated bandwidth of a sidelink carrier. The allocated bandwidth is allocated for a transmission from a second sidelink device to the first sidelink device of a physical sidelink shared channel (PSSCH) including a channel state information-reference signal (CSI-RS). The first sidelink device may further include means for identifying a channel quality indicator (CQI) based on the interference value, and means for transmitting a channel state information (CSI) report including at least the CQI to the second sidelink device. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and/or 2, and utilizing, for example, the processes and/or algorithms described herein in relation to FIGS. 9-11.

The following provides an overview of examples of the present disclosure.

Example 1: A method of sidelink wireless communication at a first sidelink device, the method comprising: measuring an interference value on at least a first set of resources outside of an allocated bandwidth of a sidelink carrier, wherein the allocated bandwidth is allocated for a transmission from a second sidelink device to the first sidelink device of a physical sidelink shared channel (PSSCH) comprising a channel state information-reference signal (CSI-RS); identifying a channel quality indicator (CQI) based on the interference value; and transmitting a channel state information (CSI) report comprising at least the CQI to the second sidelink device.

Example 2: The method of example 1, wherein the measuring the interference value further comprises: measuring a first interference value on the first set of resources; and measuring a second interference value on a second set of resources.

Example 3: The method of example 2, wherein the identifying the CQI based on the interference value further comprises: identifying a first CQI based on the first interference value; and identifying a second CQI based on the second interference value.

Example 4: The method of example 3, wherein the transmitting the CSI report further comprises: transmitting a first CSI report comprising the first CQI; and transmitting a second CSI report comprising the second CQI.

Example 5: The method of example 3, wherein the transmitting the CSI report further comprises: transmitting the CSI report comprising the first CQI and the second CQI.

Example 6: The method of example 2, wherein the identifying the CQI further comprises: identifying the CQI based on the first interference value and the second interference value.

Example 7: The method of any one of examples 2 through 6, wherein the first set of resources comprises a first bandwidth above the allocated bandwidth and the second set of resources comprises a second bandwidth below the allocated bandwidth.

Example 8: The method of any of examples 2 through 6, wherein the second set of resources are within the allocated bandwidth.

Example 9: The method of example 8, wherein the first set of resources and the second set of resources comprise channel state information-interference measurement (CSI-IM) resources defined for the first sidelink device.

Example 10: The method of example 9, further comprising: receiving an indication of the CSI-IM resources from the second sidelink device via a radio resource control message or sidelink control information.

Example 11: The method of example 9, wherein an indication of the CSI-IM resources is preconfigured on the first sidelink device.

Example 12: The method of any one of examples 8 through 11, wherein the second set of resources is within a single sub-channel within the allocated bandwidth.

Example 13: The method of any one of examples 8 through 11, wherein the second set of resources comprises the allocated bandwidth.

Example 14: The method of any one of examples 1 through 13, further comprising: selecting the first set of resources based on the allocated bandwidth.

Example 15: The method of any one of examples 1 through 14, wherein the first set of resources comprises more than two symbols.

Example 16: The method of any one of examples 1, 14, or 15, wherein the first set of resources comprises a set of non-consecutive symbols.

Example 17: The method of example 16, wherein the identifying the CQI further comprises: identifying the CQI based on the interference value measured across the set of non-consecutive symbols.

Example 18: The method of example 16, wherein the identifying the CQI further comprises: identifying a respective CQI for each symbol of the set of non-consecutive symbols or for each group of consecutive symbols within the set of non-consecutive symbols.

Example 19: The method of example 18, wherein the transmitting the CSI report further comprises: transmitting the CSI report comprising the respective CQIs.

Example 20: The method of example 18, wherein the transmitting the CSI report further comprises: transmitting the CSI report comprising respective differential CQI values associated with the respective CQIs, the respective differential CQI values comprising respective differences between the respective CQIs and a global CQI based on a global interference measurement across the set of non-consecutive symbols.

Example 21: A first sidelink device in a wireless communication network comprising a wireless transceiver, a memory, and processor coupled to the wireless transceiver and the memory, the processor and memory configured to perform a method of any one of examples 1 through 20.

Example 22: A first sidelink device in a wireless communication network comprising at least one means for performing a method of any one of examples 1 through 20.

Example 23: An article of manufacture for use by a first sidelink device in a wireless communication network comprising a non-transitory computer-readable medium having stored therein instructions executable by one or more processors of the first sidelink device to perform a method of any one of examples 1 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 7, and 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of sidelink wireless communication at a first sidelink device, the method comprising:
   measuring an interference value on at least a first set of resources outside of an allocated bandwidth of a sidelink carrier, wherein the allocated bandwidth is allocated for a transmission from a second sidelink device to the first sidelink device of a physical sidelink shared channel (PSSCH) comprising a channel state information-reference signal (CSI-RS);
   identifying a channel quality indicator (CQI) based on the interference value; and
   transmitting a channel state information (CSI) report comprising at least the CQI to the second sidelink device.

2. The method of claim 1, wherein the measuring the interference value further comprises:
measuring a first interference value on the first set of resources; and
measuring a second interference value on a second set of resources.

3. The method of claim 2, wherein the identifying the CQI based on the interference value further comprises:
identifying a first CQI based on the first interference value; and
identifying a second CQI based on the second interference value.

4. The method of claim 3, wherein the transmitting the CSI report further comprises:
transmitting a first CSI report comprising the first CQI; and
transmitting a second CSI report comprising the second CQI.

5. The method of claim 3, wherein the transmitting the CSI report further comprises:
transmitting the CSI report comprising the first CQI and the second CQI.

6. The method of claim 2, wherein the identifying the CQI further comprises:
identifying the CQI based on the first interference value and the second interference value.

7. The method of claim 2, wherein the first set of resources comprises a first bandwidth above the allocated bandwidth and the second set of resources comprises a second bandwidth below the allocated bandwidth.

8. The method of claim 2, wherein the second set of resources are within the allocated bandwidth.

9. The method of claim 8, wherein the first set of resources and the second set of resources comprise channel state information-interference measurement (CSI-IM) resources defined for the first sidelink device.

10. The method of claim 9, further comprising:
receiving an indication of the CSI-IM resources from the second sidelink device via a radio resource control message or sidelink control information.

11. The method of claim 9, wherein an indication of the CSI-IM resources is preconfigured on the first sidelink device.

12. The method of claim 8, wherein the second set of resources is within a single sub-channel within the allocated bandwidth.

13. The method of claim 8, wherein the second set of resources comprises the allocated bandwidth.

14. The method of claim 1, further comprising:
selecting the first set of resources based on the allocated bandwidth.

15. The method of claim 1, wherein the first set of resources comprises more than two symbols.

16. The method of claim 1, wherein the first set of resources comprises a set of non-consecutive symbols.

17. The method of claim 16, wherein the identifying the CQI further comprises:
identifying the CQI based on the interference value measured across the set of non-consecutive symbols.

18. The method of claim 16, wherein the identifying the CQI further comprises:
identifying a respective CQI for each symbol of the set of non-consecutive symbols or for each group of consecutive symbols within the set of non-consecutive symbols.

19. The method of claim 18, wherein the transmitting the CSI report further comprises:
transmitting the CSI report comprising the respective CQIs.

20. The method of claim 18, wherein the transmitting the CSI report further comprises:
transmitting the CSI report comprising respective differential CQI values associated with the respective CQIs, the respective differential CQI values comprising respective differences between the respective CQIs and a global CQI based on a global interference measurement across the set of non-consecutive symbols.

21. A first sidelink device in a wireless communication network, comprising:
a memory one or more memories; and
one or more processors coupled to the one or more memories, wherein the one or more processors are configured to cause the first sidelink device to:
measure an interference value on at least a first set of resources outside of an allocated bandwidth of a sidelink carrier, wherein the allocated bandwidth is allocated for a transmission from a second sidelink device to the first sidelink device of a physical sidelink shared channel (PSSCH) comprising a channel state information-reference signal (CSI-RS);
identify a channel quality indicator (CQI) based on the interference value; and
transmit a channel state information (CSI) report comprising at least the CQI to the second sidelink device.

22. The first sidelink device of claim 21, wherein the one or more processors are further configured to cause the first sidelink device to:
measure a first interference value on the first set of resources; and
measure a second interference value on a second set of resources.

23. The first sidelink device of claim 22, wherein the one or more processors are further configured to cause the first sidelink device to:
identify a first CQI based on the first interference value; and
identify a second CQI based on the second interference value.

24. The first sidelink device of claim 23, wherein the one or more processors are further configured to cause the first sidelink device to:
transmit a first CSI report comprising the first CQI; and
transmit a second CSI report comprising the second CQI.

25. The first sidelink device of claim 23, wherein the one or more processors are further configured to cause the first sidelink device to:
transmit the CSI report comprising the first CQI and the second CQI.

26. The first sidelink device of claim 22, wherein the one or more processors are further configured to cause the first sidelink device to:
identify the CQI based on the first interference value and the second interference value.

27. The first sidelink device of claim 22, wherein the first set of resources comprises a first bandwidth above the allocated bandwidth and the second set of resources comprises a second bandwidth below the allocated bandwidth.

28. The first sidelink device of claim 22, wherein the second set of resources are within the allocated bandwidth.

29. The first sidelink device of claim 28, wherein the first set of resources and the second set of resources comprise channel state information-interference measurement (CSI-IM) resources defined for the first sidelink device.

30. The first sidelink device of claim 29, wherein the one or more processors are further configured to cause the first sidelink device to:
receive an indication of the CSI-IM resources from the second sidelink device via a radio resource control message or sidelink control information.

31. A first sidelink device in a wireless communication network, comprising:
means for measuring an interference value on at least a first set of resources outside of an allocated bandwidth of a sidelink carrier allocated for a transmission of a physical sidelink control channel comprising a channel state information-reference signal (CSI-RS) from a second sidelink device to the first sidelink device;
means for identifying a channel quality indicator (CQI) based on the interference value; and
means for transmitting a channel state information (CSI) report comprising at least the CQI to the second sidelink device.

32. An article of manufacture for use by a first sidelink device in a wireless communication network, the article comprising:
a computer-readable medium having stored therein instructions executable by one or more processors of the first sidelink device to:
measure an interference value on at least a first set of resources outside of an allocated bandwidth of a sidelink carrier allocated for a transmission of a physical sidelink control channel comprising a channel state information-reference signal (CSI-RS) from a second sidelink device to the first sidelink device;
identify a channel quality indicator (CQI) based on the interference value; and
transmit a channel state information (CSI) report comprising at least the CQI to the second sidelink device.

33. The method of claim 8, wherein the transmitting the CSI report further comprises:
transmitting the CSI report comprising a first CQI identified based on the first interference value and a second CQI identifying a second CQI based on the second interference value.

34. The method of claim 8, wherein the identifying the CQI further comprises:
identifying the CQI based on the first interference value and the second interference value.

* * * * *